United States Patent [19]

Sheibley

[11] 4,133,941

[45] Jan. 9, 1979

[54] FORMULATED PLASTIC SEPARATORS FOR SOLUBLE ELECTRODE CELLS

[75] Inventor: Dean W. Sheibley, Sandusky, Ohio

[73] Assignee: The United States of America as represented by the Administrator of the National Aeronautics and Space Administration, Washington, D.C.

[21] Appl. No.: 776,146

[22] Filed: Mar. 10, 1977

[51] Int. Cl.² .................................................. H01M 8/18
[52] U.S. Cl. .................................................. 429/33; 429/101
[58] Field of Search .................. 429/23, 33, 101, 105; 204/295, 296

[56] References Cited

U.S. PATENT DOCUMENTS

| 3,730,872 | 5/1973 | Marze | 204/296 |
| 3,996,064 | 12/1976 | Thaller | 429/23 |

OTHER PUBLICATIONS

Ion Exchange, Helfferich, McGraw-Hill, 1962, pp. 62 and 63.

Primary Examiner—Anthony Skapars
Attorney, Agent, or Firm—Norman T. Musial; John R. Manning; James A. Mackin

[57] ABSTRACT

Membranes comprising a hydrochloric acid-insoluble sheet of a mixture of a rubber and a powdered ion transport material. The sheet can be present as a coating upon a flexible and porous substrate. These membranes can be used in oxidation-reduction electrical accumulator cells wherein the reduction of one member of a couple is accompanied by the oxidation of the other member of the couple on the other side of the cell and this must be accompanied by a change in chloride ion concentration in both sides.

18 Claims, 1 Drawing Figure

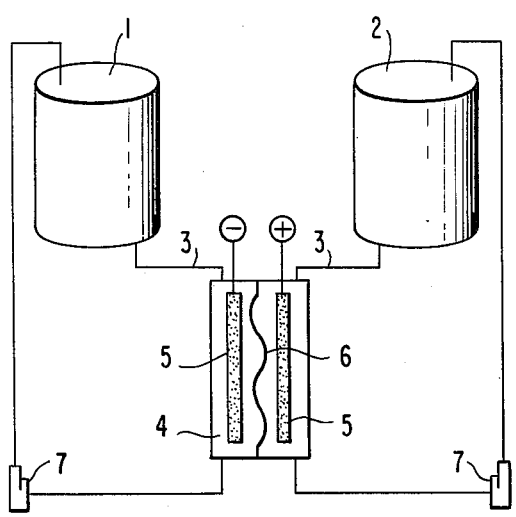

FORMULATED PLASTIC SEPARATORS FOR SOLUBLE ELECTRODE CELLS

ORIGIN OF THE INVENTION

This invention was made by an employee of the United States Government and may be manufactured or used by or for the Government without the payment of any royalties thereon or therefor.

BACKGROUND OF THE INVENTION

The development of means of storing bulk quantities of electrical power has become increasingly important in recent years. Redox cells, having soluble electrodes in both of the charged and discharged states, have been the object of increased interest as a method for the efficient storage of electrical energy. Such redox cells could store energy generated from time dependent energy sources such as solar electric and windmill electric installations. Examples of redox cells which can be used in connection with the present invention are described in detail in the technical paper "Electrically Rechargable Redox Flow Cells" by Lawrence H. Thaller, NASA TM X-71540. Additionally, such flow cells are described in U.S. Pat. No. 3,996,064 which is hereby incorporated by reference. In their simpliest embodiments, these redox flow cells contain two storage tanks, each containing one of the two metal ions, together with chloride anions which make up the redox couple. Although almost any redox couple can be used in such a cell, considerations regarding efficiency can be made in the choice of the particular couple. Thus, systems such as the $Fe^{+2}/Fe^{+3}//Ti^{+3}/TiO^{+2}$ and the $Fe^{+2}/Fe^{+3}//Cr^{+3}/Cr^{+2}$ systems are preferred. Thus, the cathodic fluid,. e.g., aqueous concentrated $Fe^{+3}$, and the anodic fluid, e.g., aqueous concentrated $Ti^{+3}$, are fed from their respective tanks through the redox flow cell where the system can either be charged from an external source or can be discharged to release the stored electrical energy. The power that can be withdrawn from or put back into the system depends on many factors including the tank volumes, the flow rates and the electrochemical features of the particular redox couple utilized and the characteristics of the electrode compartments.

In a two tank system employing multiple passes of the fluid, the fluid would constantly be recycled after passage through the fuel cell. In a four tank system, the fluids would pass from their respective tanks through the fuel cell and then into two other storage tanks. The system could then be electrically recharged by applying a suitable voltage to the terminals of the power conversion section as the fluids are pumped back up to the original tanks.

A two-tank system is shown in the drawing. The anodic fluid and cathodic fluid tanks are represented by 1 and 2, respectively. Pipelines 3 for the feeding operation to the redox flow cell are provided from the tanks. The redox flow cell 4 contains inert electrodes 5 and a selective membrane 6. After passing through the cell, the fluids are returned to tanks 1 and 2 by pumps 7.

The costs of the electrical accumulator installations have been the subject of much interest as indicated by the technical paper "Cost and Size Estimates for an Electrochemical Bulk Energy Storage Concept" by Marvin Warshay and Lyle O. Wright, NASA TM X-71805. Deployment of the electrical accumulator system utilizing a redox cell system with a solar power source has been the subject of the technical paper "The Redox Flow System for Solar Photovoltaic Energy Storage" by Patricia O'Donnel, Randall F. Gahn and William Pfeiffer, NASA TM X-73562.

U.S. Ser. No. 707,124, filed July 20, 1976, of which the inventor of the present application is co-inventor, describes the use of hydrochloric acid-silica gels as an ion transport medium for use in the membrane separating the couple compartments of such redox flow cells.

The membrane utilized must provide an impermeable barrier to the cations of the particular couple utilized. However, the membranes must be permeable to the extent of maintaining the charge neutrality of each compartment by the migration of the anion used through the membrane. It should be noted that fuel cells can be designed with either anions or cations migrating through the membrane to provide the neutralization required. However, there is an inherent disadvantage from an energy standpoint in moving cations from the anode compartment during discharge as opposed to moving anions from the cathode compartment. That is, if a hydrogen cation is required to migrate during discharge, one mole of hydrochloric acid is required per Faraday over and above any acid that may be required for pH adjustment needed for solution stabilazation.

Therefor, redox fuel cells that use anion migration through the membrane are somewhat preferred. Anions that can be used with the gels of the present invention include halide ions such as chloride and bromide.

Materials that have been used as anion-permeable membranes include polymers such as IONAC 3475. Such membranes can be made by grinding a quaternary ammonium ion-exchange resin to a powder and then polymerizing a monomer in the present of the thus-formed powder. Additionally, a web can be used in conjunction with the membranes to provide support.

Among the prior art membranes are those described in U.S. Pat. No. 3,497,389 issued to Carl Berger et al. These membranes utilize inorganic additives of controlled water vapor characteristics capable of retaining water and providing water vapor pressures above 100° C. The additives can be mixed with the ion conducting material, e.g., zirconium phosphate, granulated and pressed into discs which are then sintered.

Further, prior art structures include ceramic membranes such as those described in U.S. Pat. No. 3,392,103 issued to Carl Berger.

Other separators for use in different types of batteries have been described in U.S. Pat. No. 2,816,154 to Mendelsohn and U.S. Pat. No. 3,018,316 to Higgins.

An object of the present invention is a membrane that can be used in bulk electrical energy storage systems which has a low ionic resistivity, high selectivity for anions as opposed to metal cations and low electronic conductivity.

A further object of the invention is a membrane for use in a redox flow cell which exhibits minimal increases in resistivity with the passage of time and which prevents the accumulation of unequal amounts of water between the two sides of the redox cells.

SUMMARY OF THE INVENTION

It has now been found that a rubber-ion transport material sheeting formulated with or without a flexible and porous substrate posesses desirable characteristics as the membrane between the acid compartments of a redox couple for use in a bulk electrical energy storage system.

BRIEF DESCRIPTION OF THE DRAWING

The drawing shows an electrically rechargeable bulk power storage system with the anion transport membrane 6 of the invention.

DETAILED DESCRIPTION OF THE INVENTION

The rubber based resin or polymer used in the sheeting of the present invention can be any of the well known thermoplastic rubbers which are resistant to concentrated hydrochloric acid. This property is necessitated by the presence of concentrated hydrochloric acid in both of the redox flow cell couple compartments. Since concentrations of hydrochloric acid ranging from 0.5 to 6.0 normal are generally used in the redox flow cells, the rubber utilized can be satisfactorily qualitatively tested by immersing a block of the rubber in 6.0 normal hydrochloric acid overnight and observing any deterioration. Thus, the rubber can be a block copolymer selected from the group of thermoplastic rubbers consisting of chains of three blocks, e.g., an elastomeric block in the center and a thermoplastic (polystyrene) block on each end. The elastomeric mid block is an ethylene-butylene rubber. Other types of block copolymers have polybutadiene or polyisoprene midblocks. Additionally, rubbers such as a copolymer of styrene and ethylene-butylene rubber can be used. One such copolymer is Kraton GX 7050. The rubber component of the sheeting is usually compounded with the other ingredients after being cut into fine particles in order to facilitate solution. Alternatively, the rubber can be cut into a solution with the solvent only utilizing a high speed blender before this mixture is added to the other ingredients.

The sheeting comprising the rubber and the ion transport material can be used per se or can be used in the form of a laminate wherein it is present as a coating upon a flexible and porous substrate as will be explained hereinafter. In any case, the sheeting is prepared by mixing the rubber, ion transport material and solvent, pouring this mixture in the form of a layer and thereafter drying the layer by allowing the solvent to evaporate.

The solvent that is used need only be one that can completely dissolve the rubber and allow the ion transport material to also become dissolved or suspended. Although this dissolving of the rubber appears to result in a solution, this may not be true in a strict chemical sense. Chlorinated hydrocarbon solvents have been found to be useful in the present invention with trichloroethylene or chloroform being preferred. However, essentially all solvents which can dissolve rubber to the extent necessary to completely intermix the rubber and the ion transport material can be used in the present invention. Thus, toluene has been found to be useful as the solvent, a rubber such as Kraton GX 7050 going into toluene slightly easier than into trichloroethylene.

The substrate with which the sheeting can be used must be flexible and porous but can be any desired thickness. Fuel-cell grade asbestos sheet about 10 mils thick has been found to be very satisfactory and a suitable fuel-cell grade sheet can be obtained from the Quinn-T Company. Ordinary news print, when coated with the sheeting mixture of the present invention makes an excellent separator for use between the redox cell compartments. Further, additional substrates can be a variety of microporous sheets about 10 to 20 mils in thickness, e.g., the A-05 or A-10 foamed polyvinyl chloride-filled sheets obtained from Amerace Corporation of Butler, New Jersey. A further substrate is the Kimberly-Clark Kimcloth having a weight of 1 to 2 ounces per square yard which is an embossed poly-propylene non-woven mat having a thickness of about 6 to 12 mils. An additional substrate can be a Dacron cloth. It is apparent from the above listing that a substantial variety of flexible and porous substrates can be used in the present invention.

As defined herein, a chloride ion transport membrane is one which when used with a metal couple wherein oxidation and reduction takes place, respectively on either side of the membrane, the fuel cell will charge or discharge properly and will not be impeded by the inability of the membrane to equalize the charges on either side thereof. Thus, in a $TiCl_3$-$TiCl_4$ and $FeCl_3$-$FeCl_2$ system, the former is the anolyte while the latter is the catholyte. On discharge, $FeCl_3$ is reduced to $FeCl_2$ while $TiCl_3$ is oxidized to $TiCl_4$. The ion exchange membrane allows the passage of chlorine ions, i.e., chloride, from one compartment to the other to preserve electroneutrality. However, this can also take place by the passage of $H^+$, these two situations being summarized below:

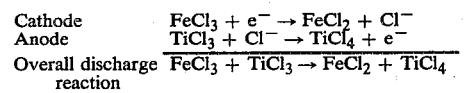

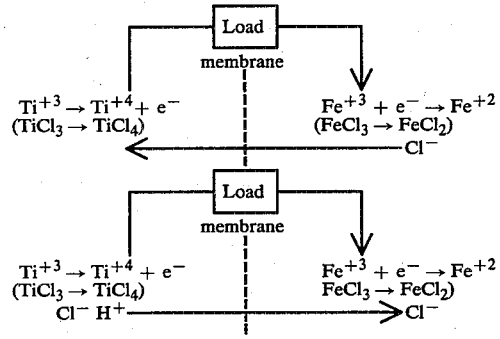

The ion transport material is used in an amount of from about 50 to 20 volume % as compared with about 50 to 80 volume % of the rubber. Preferably, the amount of the ion transport material is about 30 to 35 volume %. Utilization of more than about 50 volume % of the ion transport material may result in the creation of holes greater than 100 angstroms which can cause intermixing of the two couple solutions resulting in a lower effeciency of the redox cell.

The ion transport material should be insoluble in 6 Normal hydrochloric acid, the term "insoluble" being used herein to denote the situation where no solubility can be observed and the situation where the solubility is extremely low.

Preferred among the ion transport materials are salts of a chloride anion and a phosphonium, tertiary ammonium or quaternary ammonium cation, a metal oxide, a silicate or boric acid. Especially preferred among these materials are the hydrochlorides of cross-linked poly-4-vinyl pyridine and polybenzimidazole.

The following specific materials have been used in the membranes of the present invention:

1. Amberlite IRA-400
2. aniline hydrochloride
3. crosslinked poly 4-vinyl pyridine
4. ethylene tris (2-cyanoethyl) phosphonium bromide
5. polymerized triazine resins
6. titanium dioxide
7. magnesium zirconium silicate
8. polybenzimidazole
9. boric acid
10. colloidal montmorillonite
11. synthetic saponite
12. synthetic hectorite
13. Amberlite IRA-120

Although the above ion transport materials are used as fine powders in sizes ranging from about 0.01 to 10 microns in diameter, the titanium dioxide mentioned above is utilized as a power in sizes ranging from 15 to 40 millimicrons in diameter. After the membranes are prepared as dried sheetings, they are immersed in 6 Normal hydrochloric acid for at least 4 hours in order to convert any salts to the chlorides salts and in order to convert any neutral amines to the chloride salts. However, other normalities can be used.

Tertiary amines have been found to have very stable electrical resistance in the membranes of the present invention while quaternary amines tend to have increasing resistance with time but have a desirably high output initially.

Although it is reasonably certain that the ammonium chlorides salts act as ion transport materials by the transport of chloride ions in the membranes of the present invention, materials such as titanium dioxide having areas of 50 to 100 square meters per gram may be exhibiting an adsorption phenomon and may actually be transporting $H^+$ cations. Therefore, the chloride anion transport membranes of the present invention are defined as being suitable separators for redox flow cells having chloride anions in hydrochloric acid solutions whereby the flow cell can be charged, discharged and thereafter continuously recycled for extended periods of time.

The membranes of the present invention may additionally contain a liquid tertiary amine, secondary amine or mixture thereof in an amount up to about 10% by weight of the ionic transport material. This addition tends to improve the electrical output of the membrane. However, these amines should be of sufficient molecular weight to be substantially insoluble in the acid solution.

In order to prepare a membrane of the present invention, the rubber, solvent and ion transport material are placed in a bulk mill and milled over night. However, it may be found desirable, especially with the Kraton rubber mentioned above, to cut the rubber into solution with a high speed blender before being put into the bulk mill. When the milling is complete, the material viscosity is adjusted, if necessary, by the addition of solvent in order to give a viscosity range of about 15 to 20 seconds with a No. 3 Zahn cup at 25° C.

The thus-produced mixture can then be formed into a dried sheet, applied as a coating to a flexible and porous substrate or formed into a dried sheet and thereafter laminated to a flexible and porous substrate by conventional means. If applied to a substrate to form a dried coating, it can be applied to one or both sides. Further, it can be applied to one side and two of the membranes thus-formed can be utilized together as the membrane of the cell.

Further, different coatings can be applied to two separate flexible sheets and the combination of two membranes thus-formed can be used as a membrane of the fuel cell. It has surprisingly been found that the charging and discharging characteristics of the cell will differ according to the orientation of the thus-formed laminate with respect to the two couple compartments. For example, it has been found that it is preferable to have a tertiary amine coating on the iron side with a quaternary amine on the titanium side of a Fe-Ti metal couple as described above. This finding is described more fully in Examples 6 and 7.

Which ever method is used for the formation of the membrane, the evaporation of the solvent has suprisingly been found to give rise to micropores in the surface less than about 100 Å and this is believed to be one of the reasons for the excellent characteristics of the membranes of the present invention.

After the milling is completed, the material is applied to either a flexible and porous substrate or to a surface from which the layer can be later removed. Knife-coating procedures can be used for this operation and the coating should be about 10 to 40 mils in wet thickness, preferably about 25 mils. Alternatively, the coating may be applied by using a roller or by dipping the substrate in the mixture. After drying overnite to accomodate solvent release, the coating is then about 1.5 to 20 mils thick and is flexible and microporous as explained above. A second coating can then be applied if desired. The finished membrane separator is then cut to a size for testing in a cell and soaked in a hydrochloric acid solution of normality comparable to the normality of the redox cell into which the membrane will be inserted. The soaking should take place for at least 4 hours in order to replace the anion therein with chloride anion and to convert neutral species into chloride salts. Then the membrane is placed into the cell consisting of a polycarbonate case, graphite electrodes, graphite cloth and rubber gaskets for sealing. The cell is then filled with 6 normal hydrochloric acid and the resistance of the assembly is measured with a bridge at 1000 Hertz. The resistances or impedances usually range from about 0.20 to 0.80 ohms. The cell is then drained and is placed in the electrical accumulator system with storage tanks and pumps for the couple solutions and a known resistance of 1 ohm through which the discharging system can release energy.

In order to test the membrane and as tested in the following examples, the couple tanks are filled with about 40 ml of 1 Molar $FeCl_3$ in 0.5 HCl on one side and about 40 ml of 1 Molar $TiCl_3$ in 6 Normal HCl on the other side (40 ml of 1 Molar solution being approximately the equivalent of 1 ampere-hour). A 1 ohm resistor is placed in the electrical circuit along with an ampere-hour intergrator and a power supply for charging. The pump is turned on and the solutions are allowed to circulate through each side of the cell for at least 2 hours to permit mixing of the solution in each respective system and wetting of the electrode and membrane circuit with solution. When the open circuit voltage and resistance is stabilized, the power characteristics of the membrane are determined by measuring the voltage-to-current ratio during application of an ever increasing electronic load. From this E/I plot, a maximum power is determined and the resistance where it occurs is calculated. These values are used for comparing one membrane to another.

Cycle testing can be conducted upon the above-described fuel cell. The test consists of an initial discharge of solutions followed by charging and discharging cycles for a period of time from several weeks up to several months. During this time, the rate of solution cross-mixing across the membrane is determined by chemical analysis and the resistance is constantly measured to monitor stability. The voltage and current as well as ampere-hours are measured and recorded each cycle to check for losses and comparison of these losses to solution mixing rates. Also during this cycle testing, the membrane should be tested in order to determine whether it causes a self-discharging of the charged solutions.

During several months of testing, the membrane resistance should increase only slightly, e.g., about 0.1 to 0.2 ohms. More desirably, the resistance should remain level or should perhaps even decrease slightly. Additionally, during this cycle testing, the time to one half concentration of each solution is calculated. Any value above 1,000 hours indicated an especially desirable membrane.

Further during this cycle testing, the change of solution volume in the reservoirs is observed and recorded. It is undersirable to have movement of water across the membrane and the membranes of the present invention should have a difference in volume after several months of less than 20%.

In this cycle, the charging is referred to as a "tapered current charge" while the discharge is referred to as a "resistive discharge".

The following non-limiting examples illustrate the preparation of the membranes of the present invention.

EXAMPLE 1

40 grams of finely-diced Kraton GX 7050 rubber was added to a high speed blender containing about 700 grams of trichloroethylene and mixing was conducted until a homogeneous solution was obtained. The solution was then added to a ball mill and milled over night with 20 grams of cross-linked poly 4-vinyl pyridine, obtained from Reilly Tar and Chemical Co. of Indianapolis, Indiana, and 22 grams of magnesium zirconium silicate powder, obtained from NL Industries of Hightstown, N.J.. The amount of solvent was adjusted to give a viscosity range of 15 to 20 seconds with a No. 3 Zahn cup at 25° C. The volume percent of ingredients excluding the solvent is 65 for GX 7050; 28 for cross-linked poly 4-vinyl pyridine; and 7 for $MgZrSiO_3$.

The material was then applied to an abestos sheet obtained from the Quinn-T Company in an amount of about 25 mils wet thickness. The wet coating was then allowed to dry overnight at room temperature.

The thus-produced membrane was then cut into a 2 inch by 2 inch square and immersed in a 6 Normal hydrochloric acid solution for 4 hours.

This membrane gave acceptable performance by the criticia mentioned above for a period of about 500 hours of cycle testing operation.

EXAMPLE 2

A membrane was prepared as indicated in Example 1 with magnesium zirconium silicate with the substitution of 21 grams of Amberlite IRA-400 in place of the pyridine compound. The IRA-400 is a quaternary amine of chloromethylated styrene-divinylbenzene copolymer and was obtained from Rohm and Haas Company.

The IRA-400 strong base anion exchanger is obtained in bead form and is powdered before use. This is accomplished by mixing equal weights of the bead and water in a high speed blender for about 5 minutes followed by allowing the water to evaporate. The powder has a size of about 5 to 10 microns. The volume percent of ingredients excluding the solvent is the same as for Example 1.

This membrane was cycled tested as indicated above for 2500 hours with little change in membrane performance.

EXAMPLE 3

A membrane was prepared as in Example 1 with the substitution of 28 grams of titanium dioxide (DeGussa P-25) for the ion transport materials of Example 1. The volume percent of ingredients excluding the solvent is 60 for GX 7050 and 40 for $TiO_2$.

When cycled tested, this membrane gave acceptable performance for 500 hours.

EXAMPLE 4

A membrane was prepared as set forth in Example 1 with the substitution of 24 grams of the quaternary amine of Example 2 for the ion exchange materials of Example 1. The volume percent of ingredients excluding the solvent is 67 for GX 7050 and 33 for IRA-400.

When cycled tested as indicated above, this membrane gave acceptable performance for 500 hours.

EXAMPLE 5

A membrane was prepared according to Example 1 with the exceptions that 17 grams of the crosslinked pyridine was used with no magnesium zirconium silicate. The volume percent of ingredients excluding the solvent is 72.5 for GX 7050 and 27.5 for cross-linked poly 4-vinyl pyridine.

When cycled tested as indicated above, this membrane gave acceptable performance for 500 hours.

EXAMPLE 6

A membrane was prepared wherein different formulations were applied to opposite sides of an asbestos sheet.

On a first side of an asbestos sheet identical to that used in Example 1, a formulation containing cross-linked poly 4-vinyl pyridine and magnesium zirconium silicate, prepared identically to the procedure in Example 1, was applied and dried. On the second side a formulation containing Amberlite IRA-400 and magnesium zirconium silicate, prepared identically to the procedure in Example 2, was applied and dried.

The thus-prepared membrane was cycle tested with the test apparatus indicated above after being immersed in a 6N HCl solution for 4 hours.

With the first side facing the Fe ion solution, results surprisingly superior to the opposite configuration were obtained. With an open circuit, the resistance was stable at only 0.8 ohms, indicating low resistance of the membrane itself. The $T_{\frac{1}{2}}$, the time during cycle testing at which ½ of the Fe ions have migrated to the Ti side of the membrane, was found to be an acceptable 4700 hours. In addition, the resistance did not increase during this cycle testing.

With a second membrane thus-produced, and with the second side facing the Fe ion solution, the $T_{\frac{1}{2}}$ was found to be 3500 hours but initial open circuit resistance was 1.5 ohms and this increased at the rate of about 0.03 ohms per day.

EXAMPLE 7

A membrane was prepared as in Example 6 with different formulations on opposite sides of an asbestos sheet.

A first formulation was prepared with Amberlite IRA-400. The bead form IRA-400 was mixed with an equal weight of water and mixed in a high speed blender for about 5 minutes. After the water was allowed to evaporate, 24 grams of powder having a size of about 5 to 10 microns was added to a homogeneous solution of 40 grams Kraton GX 7050 prepared as in Example 1. The solution was then ball-milled overnight and the amount of trichloroethylene was adjusted as in Example 1.

The second formulation was preparing by adding 17 grams of the cross-linked poly 4-vinyl pyridine used in Example 1 to the Kraton GX 7050 homogeneous solution of Example 1, ball-milling overnight and solvent adjustment thereafter as in Example 1.

After application of the first and second formulations to the asbestos sheet followed by drying and immersing in HCl as above in each case, two of the thus-produced membranes were cycle tested, with the different orientations to the Fe and Ti solutions.

With the first formulation facing the Ti solution side, the $T_{\frac{1}{2}}$ was 5600 hours but the stable resistance was 1.15 ohms and increased in this test at the rate of 0.02 ohms per day.

With the second formulation facing the Ti solution side, the $T_{\frac{1}{2}}$ was 2100 hours. The stable resistance was about the same as above but increased at the rate of 0.044 ohms per day.

It will understood that various modifications and adaptions of the invention can be made by those skilled in the art without departing from the spirit of the invention and, accordingly, the invention is not taken as limited except by the scope of the following claims.

What is claimed is:

1. A chloride anion transport membrane comprising a hydrochloric acid-insoluble sheet of a mixture of a rubber and a powdered ion transport material wherein said mixture comprises about 50 to 80 volume percent of said rubber and about 50 to 20 volume percent of said ion transport material, said sheet only has micropores less than about 100 angstroms in diameter, and said ion transport material has particle sizes ranging from about 0.01 to 10 microns, said ion transport material being a salt of a chloride anion and a phosphonium, tertiary ammonium or quaternary ammonium cation.

2. The anion transport membrane of claim 1, wherein said ion transport material is a metal oxide, a silicate or boric acid.

3. The anion transport membrane of claim 2, wherein said metal oxide is titanium dioxide and said silicate is montmorillonite, saponite, hectorite or magnesium zirconium silicate.

4. The anion transport membrane of claim 1, wherein the resistance of said membrane, when measured with the membrane between two solutions of 6N HCl with a 1000 Hz bridge, ranges from about 0.20 to 0.80 ohms.

5. The anion transport membrane of claim 1, wherein said membrane further comprises a flexible and porous substrate sheet adhered to said sheet.

6. The anion transport membrane of claim 1, wherein said ion transport material is a mixture of magnesium zirconium silicate with either crosslined poly 4-vinyl pyridine or a quaternary amine of chloromethylated styrene-divinyl benzene copolymer.

7. An electrical storage device comprising an anode, an anodic fluid, a cathode, a cathodic fluid and between said anodic and cathodic fluids, a chloride ion transport membrane comprising hydrochloric acid-insoluble sheet of a mixture of a powdered ion transport material and a rubber, wherein said mixture comprises about 70 to 65 volume percent of said rubber and about 30 to 35 volume percent of said ion transport material, said sheet only has micropores less than about 100 angstroms in diameter, and said ion transport material has particle sizes ranging from about 0.01 to 10 microns.

8. The electrical storage device of claim 7, wherein said ion transport material is a salt of a chloride anion and a phosphonium, tertiary ammonium or quaternary ammonium cation.

9. The electrical storage device of claim 7, wherein said ion transport material is a metal oxide, a silicate or boric acid.

10. The electrical storage device of claim 9, wherein said metal oxide is titanium dioxide and said silicate is montmorillonite, saponite, hectorite or magnesium zirconium silicate.

11. The electrical storage device of claim 7, wherein the resistance of said membrane, when measured with the membrane between two solutions of 6N HCl with a 1000 Hz bridge, ranges from about 0.20 to 0.80 ohms.

12. The electrical storage device of claim 7, wherein said membrane further comprises a flexible and porous substrate sheet adhered to said sheet.

13. The electrical storage device of claim 7, wherein said ion transfer material is a mixture of magnesium zirconium silicate with either cross-linked poly 4-vinyl pyridine or a quaternary amine of chloromethylated styrene-divinylbenzene copolymer.

14. A chloride anion transport membrane comprising a flexible and porous substrate sheet having on a first side thereof
    (a) a hydrochloric acid-insoluble layer of a mixture of a rubber and a first powdered ion transport material;
and on the second side thereof
    (b) a hydrochloric acid-insoluble layer of a mixture of a rubber and a second powdered ion transport material, said first and second ion transport materials being from about 20 to 50 volume percent of said hydrochloric acid insoluble layers, said layers having micropores less than 100 angstroms in diameter, said ion transport material being comprised of particles ranging in size from about 0.01 to 10 microns.

15. An electrical storage device comprising an anode, and anodic fluid, a cathode, a cathodic fluid and between said anodic and cathodic fluids, a chloride anion transport membrane comprising a flexible and porous substrate sheet having on a first side thereof
    (a) a hydrochloric acid-insoluble layer of a mixture of a rubber and a first powdered ion transport material;
and on the second side thereof
    (b) a hydrochloric acid-insoluble layer of a mixture of a rubber and a second powdered ion transport material, said first and second ion transport materials being from about 30 to 35 volume percent of said hydrochloric acid insoluble layers, said layers having micropores less than 100 angstroms in diameter, said ion transport material being comprised of particles ranging in size from about 0.01 to 10 microns.

16. The membrane of claim 14 wherein said inorganic ion transport material is magnesium zirconium silicate.

17. The electrical storage device of claim 15 wherein said ion transport material is a salt of a chloride anion and a phosphonium, tertiary ammonium or quaternary ammonium cation.

18. The electrical storage device of claim 15 wherein said ion transport material is titanium dioxide.

* * * * *